US010981420B2

(12) United States Patent
Kobori

(10) Patent No.: US 10,981,420 B2
(45) Date of Patent: Apr. 20, 2021

(54) MOTORCYCLE TIRE

(71) Applicant: Sumitomo Rubber Industries, Ltd., Hyogo (JP)

(72) Inventor: Shuji Kobori, Kobe (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 255 days.

(21) Appl. No.: 16/182,684

(22) Filed: Nov. 7, 2018

(65) Prior Publication Data
US 2019/0168543 A1 Jun. 6, 2019

(30) Foreign Application Priority Data
Dec. 4, 2017 (JP) .............................. JP2017-232468

(51) Int. Cl.
*B60C 11/03* (2006.01)
*B60C 11/04* (2006.01)
(Continued)

(52) U.S. Cl.
CPC ...... *B60C 11/0304* (2013.01); *B60C 11/0302* (2013.01); *B60C 11/0311* (2013.01); *B60C 11/04* (2013.01); *B60C 11/12* (2013.01); *B60C 11/1353* (2013.01); *B60C 2011/0348* (2013.01); *B60C 2011/0353* (2013.01); *B60C 2011/0358* (2013.01); *B60C 2011/0365* (2013.01); *B60C 2011/0367* (2013.01);
(Continued)

(58) Field of Classification Search
CPC ......... B60C 2200/10; B60C 2011/0339; B60C 2011/0337; B60C 2011/0344; B60C 11/0304; B60C 11/0302; B60C 11/032
See application file for complete search history.

(56) References Cited

U.S. PATENT DOCUMENTS

2013/0228256 A1* 9/2013 Shibamoto .......... B60C 11/0302
152/209.8

FOREIGN PATENT DOCUMENTS

CN 205553802 U 9/2016
CN 107415596 A * 12/2017
(Continued)

OTHER PUBLICATIONS

Extended European Search Report issued by the European Patent Office dated Nov. 27, 2018, which corresponds to EP18201512.3-1012 and is related to U.S. Appl. No. 16/182,684.

*Primary Examiner* — Robert C Dye
*Assistant Examiner* — Farah Taufiq
(74) *Attorney, Agent, or Firm* — Studebaker & Brackett PC

(57) ABSTRACT

A motorcycle tire includes a tread portion provided with inclined main grooves arranged between the tire equator and a first tread edge and sub-grooves smaller than the inclined main grooves in groove width. The inclined main grooves include inner main grooves each extending from a first end located on the tire equator side to a second end located on the first tread edge side with an inclination with respect to a tire circumferential direction, wherein no other grooves are provided between the first end of each inner main groove and the tire equator. The sub-grooves include first sub-grooves extending from the inner main grooves toward the tire equator with an opposite inclination direction to the inner main grooves with respect to the tire circumferential direction and terminating on the tire equator side without being communicated with any other grooves.

20 Claims, 4 Drawing Sheets

(51) Int. Cl.
*B60C 11/12* (2006.01)
*B60C 11/13* (2006.01)

(52) U.S. Cl.
CPC ............... *B60C 2011/0374* (2013.01); *B60C 2011/0376* (2013.01); *B60C 2011/0379* (2013.01); *B60C 2011/0381* (2013.01); *B60C 2011/1209* (2013.01); *B60C 2200/10* (2013.01)

(56) References Cited

FOREIGN PATENT DOCUMENTS

| | | | | |
|---|---|---|---|---|
| CN | 107415596 A | 12/2017 | | |
| GB | 2114069 A | * 8/1983 | ........... | B60C 11/032 |
| GB | 2114069 A | 8/1983 | | |
| JP | H09-039516 A | 2/1997 | | |
| JP | 2013-159207 A | 8/2013 | | |
| WO | 2017/077419 A1 | 5/2017 | | |

* cited by examiner

MOTORCYCLE TIRE

BACKGROUND ART

Field of the Disclosure

The present disclosure relates to a motorcycle tire.

Description of the Related Art

The following Patent document 1, for example, discloses a motorcycle tire having a tread portion which is provided with inner inclined main grooves around the tire equator. The above-mentioned inner inclined main grooves, for example, exert drainage performance when not only straight traveling but also turning with small camber angles.

Unfortunately, it has been difficult to obtain sufficient improved wet performance by the inner inclined main grooves only. On the other hand, when additional grooves having larger widths and/or longer lengths are provided on the tread portion, tire response when a rider leans with the motorbike to turn tends to change suddenly, resulting in deterioration of roll property.

Patent Document

[Patent Document 1]
Japanese Unexamined Patent Application Publication 2013-159207

SUMMARY OF THE DISCLOSURE

In view of the above problems in the conventional art, the present disclosure has a main object to provide a motorcycle tire capable of exerting an excellent wet performance while maintaining roll property.

According to an aspect of the disclosure, a motorcycle tire includes a tread portion including a ground contact surface curved in an arc shape manner to protrude radially outwardly, a first tread edge and a tire equator, the tread portion provided with inclined main grooves arranged between the tire equator and the first tread edge and sub-grooves smaller than the inclined main grooves in groove width. The inclined main grooves include inner main grooves each extending from a first end located on the tire equator side to a second end located on the first tread edge side with an inclination with respect to a tire circumferential direction, wherein no other grooves are provided between the first end of each inner main groove and the tire equator. The sub-grooves include first sub-grooves extending from the inner main grooves toward the tire equator with an opposite inclination direction to the inner main grooves with respect to the tire circumferential direction and terminating on the tire equator side without being communicated with any other grooves.

In another aspect of the disclosure, the tread portion has a designated rotation direction, and the inner main grooves each extend from the first end forwardly in the rotation direction toward the first tread edge.

In another aspect of the disclosure, the sub-grooves may include second sub-grooves extending from the inner main grooves toward the first tread edge with a same inclination direction as the first sub-grooves with respect to the tire circumferential direction.

In another aspect of the disclosure, the first sub-grooves each may include a portion having an angle with respect to the tire circumferential direction smaller than that of each of the second sub-grooves.

In another aspect of the disclosure, the respective second sub-grooves may be continuous smoothly to the respective first sub-grooves through the inner main grooves.

In another aspect of the disclosure, in a pair of first and second sub-grooves which are communicated with a same inner main groove, a circumferential distance from a first end of the first sub-groove located on the tire equator side to a second end of the second sub-groove located on the first tread edge side may be longer than a circumferential length of the inner main groove.

In another aspect of the disclosure, groove widths of the first sub-grooves may be in a range of from 0.3 to 1.5 mm.

In another aspect of the disclosure, groove depths of the first sub-grooves may be in a range of from 0.2 to 1.5 mm.

In another aspect of the disclosure, the inclined main grooves may include outer main grooves arranged on the first tread edge side of the first sub-grooves and inclined in an opposite direction to the inner main grooves.

In another aspect of the disclosure, the respective outer main grooves may overlap regions where the respective inner main grooves are expanded in a longitudinal direction thereof.

In another aspect of the disclosure, the sub-grooves may include third sub-grooves each having a portion that is inclined in a same direction as the first sub-grooves in a region between one inner main groove and one adjacent outer main groove.

DESCRIPTION OF THE PREFERRED EMBODIMENTS

An embodiment of the present invention will be explained below with reference to the accompanying drawings.

Figure 1:
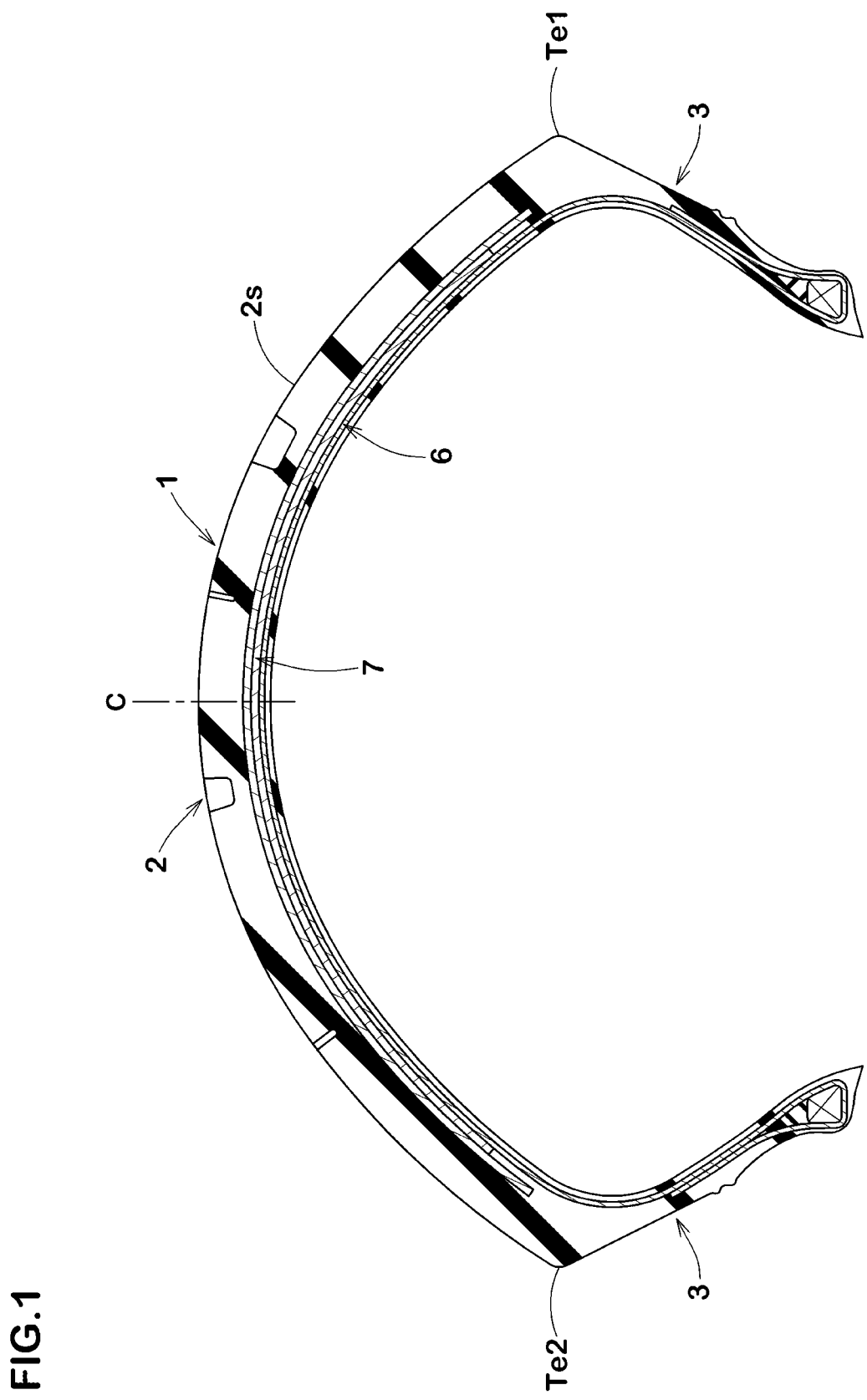
FIG. 1 is a cross-sectional view of a motorcycle tire according to an embodiment of the disclosure.
Figure 2:
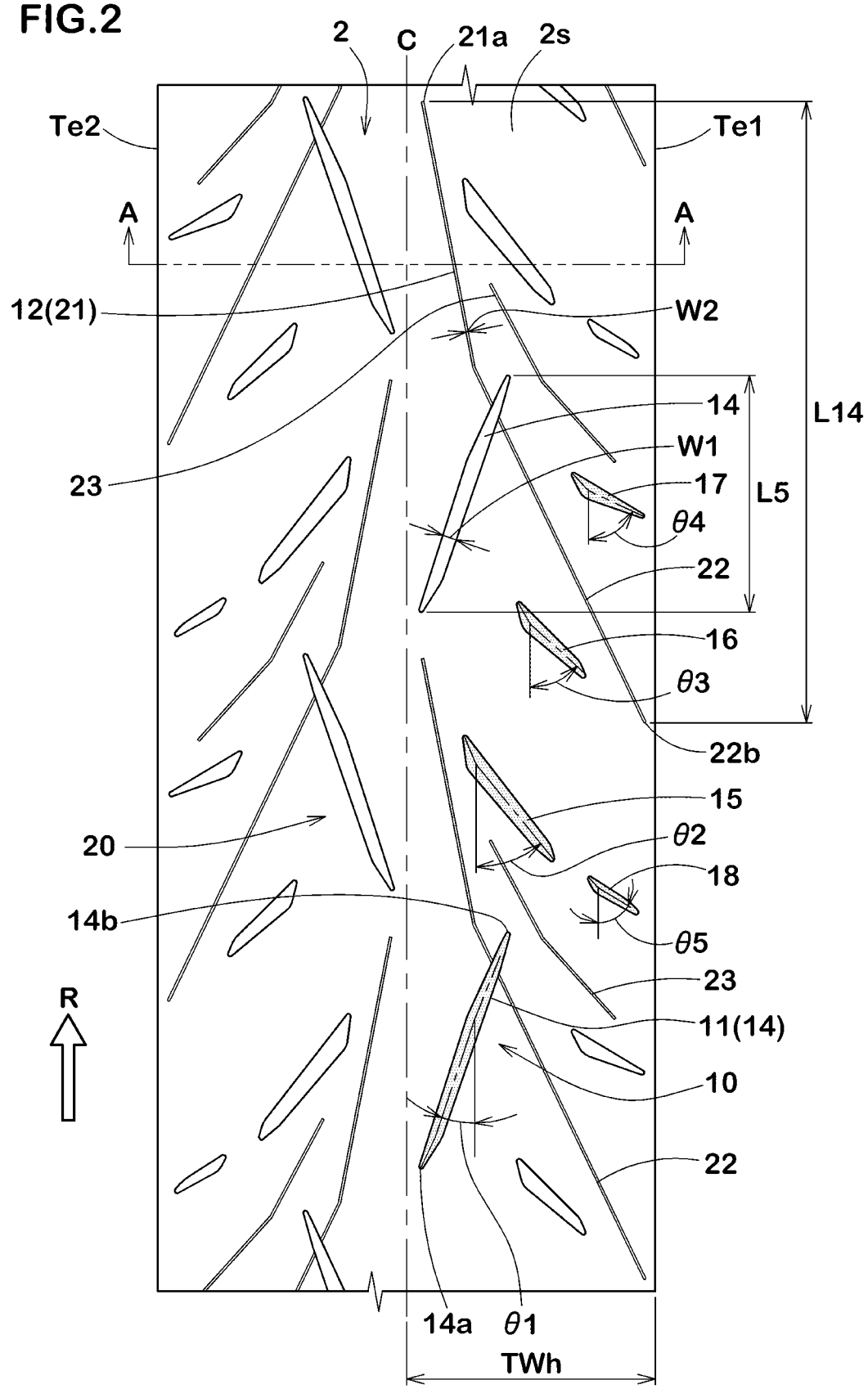
FIG. 2 is a development view of a tread portion of the tire.

FIG. 1 illustrates a cross-sectional view of a motorcycle tire (hereinafter, simply referred to as "tire") 1 under a normal state according to an embodiment of the disclosure. FIG. 2 is a development view of a tread portion 2 of the tire 1, and FIG. 1 corresponds to the cross-section taken along line A-A of FIG. 2.

The tire 1 according to the embodiment, for example, may preferably be used for rear tires for sports driving, e.g., circuit racing.

The normal state of the tire 1 is such that the tire 1 is mounted on a standard wheel rim with a standard pressure but is loaded with no tire load. Unless otherwise noted, dimensions of respective portions of the tire are values measured under the normal state.

The standard wheel rim is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

The standard pressure is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As illustrated in FIG. 1, the tire 1 according to the embodiment, under the normal state, includes the tread portion 2 that includes a first tread edge Te1, a second tread edge Te2, and a ground contact surface 2s between the first and second tread edges Te1 and Te2, wherein the ground contact surface 2s is curved in an arc shape manner to protrude radially outwardly. The tire 1 as such can obtain a sufficient ground contact surface area even when turning with large camber angles. Note that the first tread edge Te1 and the second tread edge Te2 define axially both edges of the tread portion 2, and thus these edges can come into contact with the ground when turning with maximum camber angles.

The tire 1 according to the embodiment, for example, includes a carcass 6 and a belt 7. As these, conventional structures can be used.

As illustrated in FIG. 2, the tread portion 2, for example, has a directional tread pattern having a designated rotation direction R. The rotation direction R, for example, may be indicated on sidewall portions (illustrated in FIG. 1) by a mark or character. Note that the tire 1 according to the disclosure cannot be limited to such an aspect. Further, note that a forward side in the rotation direction R corresponds to upside of FIGS. 2 to 4, and simply referred to as "forwardly" or "forward". Note that a rearward side in the rotation direction R corresponds to downside of FIGS. 2 to 4, and simply referred to as "rearward" or "rearwardly".

The tread portion 2 is provided with a plurality of first groove groups 10 and a plurality of second groove groups 20. The first groove groups 10, for example, are provided between the tire equator C and the first tread edge Te1. Note that one first groove group 10 in FIG. 2 is colored to help readers understanding. The second groove groups 20, for example, are provided between the tire equator C and the second tread edge Te2. The first groove groups 10 and the second groove groups 20 are arranged in a substantially symmetrical manner except that the first groove groups 10 are shifted in the tire circumferential direction from the second groove groups by a certain distance. Note detailed explanation for the second groove groups 20 is omitted since configuration of the first groove groups 10 can be applied to the second groove groups 20.

Each of the first groove groups 10 includes a plurality of inclined main grooves 11 and a plurality of sub-grooves 12 smaller than the inclined main grooves 11 in groove width.

It is not particularly limited, but groove widths W1 of the inclined main grooves 11 are preferably in a range of from 4.0% to 7.0% of a tread development half width TWh, for example. As used herein, the tread development half width TWh is a distance from the tire equator C to the first tread edge Te1 measured along the ground contact surface 2s of the tread portion 2. Preferably, groove depths of the inclined main grooves 11, for example, are of from 4 to 7 mm.

Preferably, groove width W2 of the sub-grooves 12, for example, are less than 2.0 mm. Preferably, groove depths of the sub-grooves 12, for example, are less than 2.0 mm. The sub-grooves 12 can be useful to reduce in rigidity of portions therearound. By arranging the sub-grooves 12 on suitable locations, the difference in rigidity between portions around the inclined main grooves 11 and the remaining portions can be reduced, resulting in improving roll property.

In each first groove group 10, the inclined main grooves 11 includes an inner main groove 14. The inclined main grooves 11, in addition to the inner main groove 14, for example, include an outer main groove 15, a first short main groove 16, a second short main groove 17 and a third short main groove 18. In each first groove group 10, the sub-grooves 12 include a first sub-groove 21. In some preferred embodiments, the sub-grooves 12 may further include a second sub-groove 22 and a third sub-groove 23.

The inner main groove 14 extends from a first end 14a located on the tire equator side C to a second end 14b located on the first tread edge Te1 side with an inclination with respect to the tire circumferential direction, wherein no other grooves are provided between the first end 14a of the inner main groove 14 and the tire equator C.

The inner main grooves 14 can be helpful to improve wet performance when not only straight traveling but also turning with small camber angles. Further, since no other grooves are provided between the tire equator C and the first end 14a of the inner main groove 14, sufficient tread rigidity around the tire equator C can be maintained to improve roll property so that riders feel linear response when the motorbike is leaned.

The first sub-groove 21 extends from the inner main groove 14 toward the tire equator C with an opposite inclination direction to the inner main groove 14 with respect to the tire circumferential direction and terminating on the tire equator C side without being communicated with any other grooves.

The first sub-groove 21, using its edges, generates friction force in a different direction to the inner main groove 14 on wet road conditions, resulting in better wet performance. On the other hand, since the first sub-groove 21 has a small groove width in relation to the inner main groove 14 and terminates without being communicated with any other grooves, it may not reduce in rigidity of a land portion around the tire equator C, thus maintaining excellent roll property.

Figure 3:
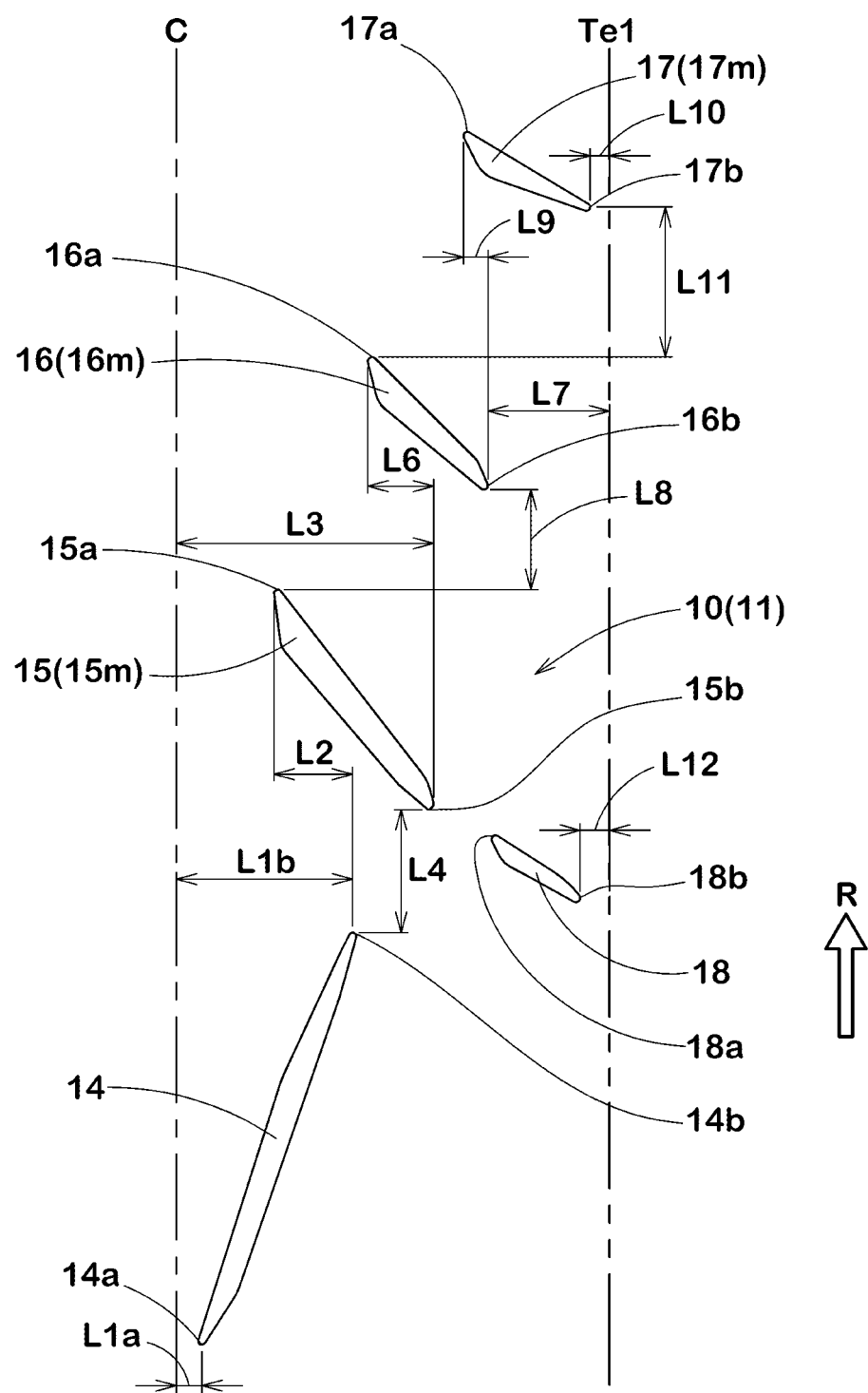
FIG. 3 is a partial enlarged view for explaining inclined main grooves.

FIG. 3 illustrates an enlarged view of the inclined main grooves 11 included in one first groove group 10. Note that in FIG. 3 the sub-grooves are not illustrated. As illustrated in FIG. 3, the inner main grooves 14 extends from the first end 14a forwardly in the rotation direction R to the first tread edge Te1 side. The inner main groove 14 with such an inclination can deliver excellent roll property. On the other hand, although the inner main groove 14 tends to send water to the tire equator C side on wet road traveling, wet performance can be improved due to the above-mentioned effect of the first sub-grooves 21.

As illustrated in FIG. 2, in order to improve roll property and wet performance in a well-balanced manner, the inner main groove 14, for example, is preferably inclined at an angle θ1 of from 15 to 30 degrees with respect to the tire circumferential direction.

The first end 14a of the inner main groove 14 is located on the first tread edge Te1 side with respect to the tire equator C. That is, the inner main groove 14 does not traverse the tire equator C. Thus, in this embodiment, on the tire equator C, a circumferentially and continuously extending plain region on which no other grooves are provided is formed. The plain region as such can provide sufficient rigidity with a land portion around the tire equator C, improving initial roll property when the motorbike is leaned.

As illustrated in FIG. 3, an axial distance L1a from the first end 14a of the inner main groove 14 to the tire equator C, for example, is preferably in a range of from 0.03 to 0.08 times the tread development half width TWh (shown in FIG. 2). Unless otherwise noted, lengths and distances of the respective portions shall mean those which are measured along the ground contact surface 2s of the tread portion 2.

Preferably, an axial distance L1b from the second end 14b of the inner main groove 14 to the tire equator C, for example, is in a range of from 0.35 to 0.45 times the tread development half width TWh. The inner main groove 14 as such can exert excellent drainage performance while maintaining better roll property.

The outer main grooves 15, for example, is located forward in the rotation direction R with respect to the inner main groove 14, and which are adjacent with each other. In this embodiment, the outer main groove 15 is arranged in such a manner as to cross a region where the inner main groove 14 is expanded in a longitudinal direction thereof. Preferably, the outer main groove 15, for example, is arranged on the first tread edge Te1 side with respect to the first sub-grooves 21 (shown in FIG. 2).

The outer main groove 15, for example, is inclined in an opposite direction to the inner main groove 14 with respect to the tire circumferential direction. That is, the outer main grooves 15 extends from a first side 15a located on the tire equator C side to a second end 15b located on the first tread edge Te1 side toward rearwardly in the rotation direction R. Preferably, an angle θ2 (shown in FIG. 2) of the outer main groove 15, for example, is in a range of from 40 to 50 degrees with respect to the tire circumferential direction. In some preferred embodiments, the angle θ2 of the outer main groove 15 is greater than the angle θ1 of the inner main groove 14.

The outer main groove 15, for example, has a length shorter than that of the inner main groove 14. The outer main groove 15, for example, has a groove width which varies in the longitudinal direction, wherein the maximum groove width portion 15m is positioned on the tire equator C side with respect to a center location in the tire axial direction of the outer main groove 15. Further, in the outer main groove 15, the groove width decreases gradually from the maximum width portion 15m to the second end 15b. Thus, response in which a rider leans with the motorbike to turn tends to increase proportionally according to an increase of the camber angle, resulting in excellent roll property.

Preferably, the first end 15a of the outer main groove 15, for example, is located on the tire equator C side with respect to the second end 14b of the inner main groove 14. Preferably, the second end 15b of the outer main groove 15, for example, is located on the first tread edge Te1 side with respect to the second end 14b of the inner main groove 14.

In order to improve roll property and wet performance in a well-balanced manner, an axial first overlapped length L2 from the first end 15a of the outer main groove 15 to the second end 14b of the inner main groove 14, for example, is preferably in a range of from 0.10 to 0.25 times the tread development half width TWh.

Preferably, an axial distance L3 from the second end 15b of the outer main groove 15 to the tire equator C, for example, is in a range of from 0.50 to 0.65 times the tread development half width TWh.

Preferably, the second end 15b of the outer main groove 15, for example, is located forward in the rotation direction R with respect to the second end 14b of the inner main groove 14. That is, the outer main grooves 15 and the inner main groove 14 are preferably arranged with a circumferential gap therebetween so as not to overlap with each other in the tire circumferential direction. Preferably, a circumferential first gap length L4 between the second end 15b of the outer main groove 15 and the second end 14b of the inner main groove 14, for example, is in a range of from 0.25 to 0.35 times a circumferential length L5 (shown in FIG. 2) of the inner main groove 14. Such a layout of the outer main groove 15 and the inner main groove 14, for example, may generate large traction when turning with large camber angles in which the second end 15b of the outer main groove 15 comes into contact with the ground.

The first short main groove 16, for example, is located forward in the rotation direction R with respect to the outer main grooves 15, and which are adjacent with each other. The first short main groove 16, for example, has a length shorter than that of the outer main groove 15. The first short main groove 16 according to the embodiment, for example, is inclined in the same direction as the outer main groove 15.

Preferably, an angle θ3 (shown in FIG. 2) of the first short main groove 16 is in a range of from 45 to 60 degrees with respect to the tire circumferential direction.

The first short main groove 16, for example, has a groove width which varies in the longitudinal direction, wherein the maximum groove width portion 16m is positioned on the tire equator C side with respect to a center location in the tire axial direction of the first short main groove 16. Further, in the first short main groove 16, the groove width decreases gradually from the maximum width portion 16m to the first tread edge Te1 side.

Preferably, a first end 16a of the first short main groove 16 located on the tire equator C side, for example, is located on the tire equator C side with respect to the second end 15b of the outer main groove 15. Preferably, a second end 16b of the first short main groove 16, for example, is located on the first tread edge Te1 side with respect to the second end 15b of the outer main groove 15.

Preferably, an axial second overlapped length L6 from the first end 16a of the first short main groove 16 to the second end 15b of the outer main groove 15, for example, is in a range of from 0.05 to 0.15 times the tread development half width TWh. Preferably, the second overlapped length L6 is smaller than the first overlapped length L2 in order to further improve roll property so that response in which a rider leans with the motorbike to turn tends to increase proportionally according to an increase of the camber angle.

Preferably, an axial distance L7 from the second end 16b of the first short main groove 16 to the first tread edge Te1, for example, is in a range of from 0.20 to 0.35 times the tread development half width TWh.

Preferably, the second end 16b of the first short main groove 16, for example, is located forward in the rotation direction R with respect to the first end 15a of the outer main grooves 15. That is, the first short main groove 16 and the outer main grooves 15 are preferably arranged with a circumferential gap therebetween so as not to overlap with each other in the tire circumferential direction. Preferably, a circumferential second gap length L8 between the second end 16b of the first short main groove 16 and the first end 15a of the outer main groove 15, for example, is in a range of from 0.20 to 0.30 times the circumferential length L5 of the inner main groove 14. Such a layout of the first short main groove 16 and the outer main grooves 15, for example, may generate large traction when turning while maintaining better drainage performance.

The second short main groove 17, for example, is located forward in the rotation direction R with respect to the first short main groove 16, and which are adjacent with each other. The second short main groove 17, for example, has a length shorter than that of the first short main groove 16. The second short main groove 17 according to the embodiment, for example, is inclined in the same direction as the first short main groove 16.

Preferably, an angle θ4 (shown in FIG. 2) of the second short main groove 17, for example, is in a range of from 60 to 70 degrees with respect to the tire circumferential direction. In some preferred embodiments, the maximum angle of the second short main groove 17 with respect to the tire circumferential direction is greater than the maximum angle of the first short main groove 16 with respect to the tire circumferential direction. Thus, sufficient axial rigidity of a portion around the second short main groove 17 is maintained, resulting in large camber thrust.

The second short main groove 17, for example, has a groove width which varies in the longitudinal direction, wherein the maximum groove width portion 17m is positioned on the tire equator C side with respect to a center location in the tire axial direction of the second short main groove 17. Further, in the second short main groove 17, the groove width decreases gradually from the maximum width portion 17m to the first tread edge Te1 side.

Preferably, a first end 17a of the second short main groove 17 located on the tire equator C side, for example, is located on the tire equator C side with respect to the second end 16b of the first short main groove 16. Preferably, a second end 17b of the second short main groove 17 on the first tread edge Te1 side, for example, is located on the first tread edge Te1 side with respect to the second end 16b of the first short main groove 16.

Preferably, an axial third overlapped length L9 from the first end 17a of the second short main groove 17 to the second end 16b of the first short main groove 16, for example, is in a range of from 0.05 to 0.10 times the tread development half width TWh. Preferably, the third overlapped length L9, for example, is shorter than the second overlapped length L6 in order to improve wet performance and roll property in a well-balanced manner.

Preferably, an axial distance L10 from the second end 17b of the second short main groove 17 to the first tread edge Te1, for example, is in a range of from 0.02 to 0.07 times the tread development half width TWh.

Preferably, the second end 17b of the second short main groove 17, for example, is located forward in the rotation direction R with respect to the first end 16a of the first short main groove 16. That is, the second short main groove 17 and the first short main groove 16 are preferably arranged with a circumferential gap therebetween so as not to overlap with each other in the tire circumferential direction. Preferably, a circumferential third gap length L11 between the second end 17b of the second short main groove 17 and the first end 16a of the first short main groove 16, for example, is in a range of from 0.30 to 0.45 times the circumferential length L5 of the inner main groove 14. Preferably, the third gap length L11, for example, is longer than the second gap length L8. Such a layout of the second short main groove 17 and the first short main groove 16, for example, may generate large traction when turning with large camber angles in which the first tread edge Te1 comes into contact with the ground.

The third short main groove 18, for example, is located forward in the rotation direction R with respect to the second end 14b of the inner main groove 14, and is located rearward in the rotation direction R with respect to the second end 15b of the outer main groove 15. The third short main groove 18, for example, is located on the first tread edge Te1 side with respect to the second end 16b of the first short main groove 16. Thus, a first end 18a of the third short main groove 18 on the tire equator C side is adjacent to the second end 15b the outer main grooves 15.

The third short main groove 18, for example, is inclined in the same direction as the outer main grooves 15. Preferably, an angle θ5 (shown in FIG. 2) of the third short main groove 18, for example, is in a range of from 55 to 65 degrees with respect to the tire circumferential direction. In some preferred embodiments, the maximum angle of the third short main groove 18 with respect to the tire circumferential direction is greater than the maximum angle of the outer main grooves 15 with respect to the tire circumferential direction. Thus, sufficient axial rigidity of a portion around the third short main groove 18 can be maintained to generate large camber thrust.

Preferably, the first end 18a of the third short main groove 18 on the tire equator C side, for example, is located so as to cross a region in which the outer main groove 15 is expanded in a longitudinal direction thereof. Thus, third short main groove 18 makes up for a shortage of drainage of the outer main groove 15, resulting in better wet performance.

Preferably, the third short main groove 18, for example, is located within an axial region of the second short main groove 17, i.e., located axially outwardly of the first end 17a but axially inwardly of the second end 17b.

Preferably, an axial length L12 of a second end 18b of the third short main groove 18 on the first tread edge Te1 side to the first tread edge Te1, for example, is in a range of from 0.03 to 0.10 times the tread development half width TWh.

Figure 4:
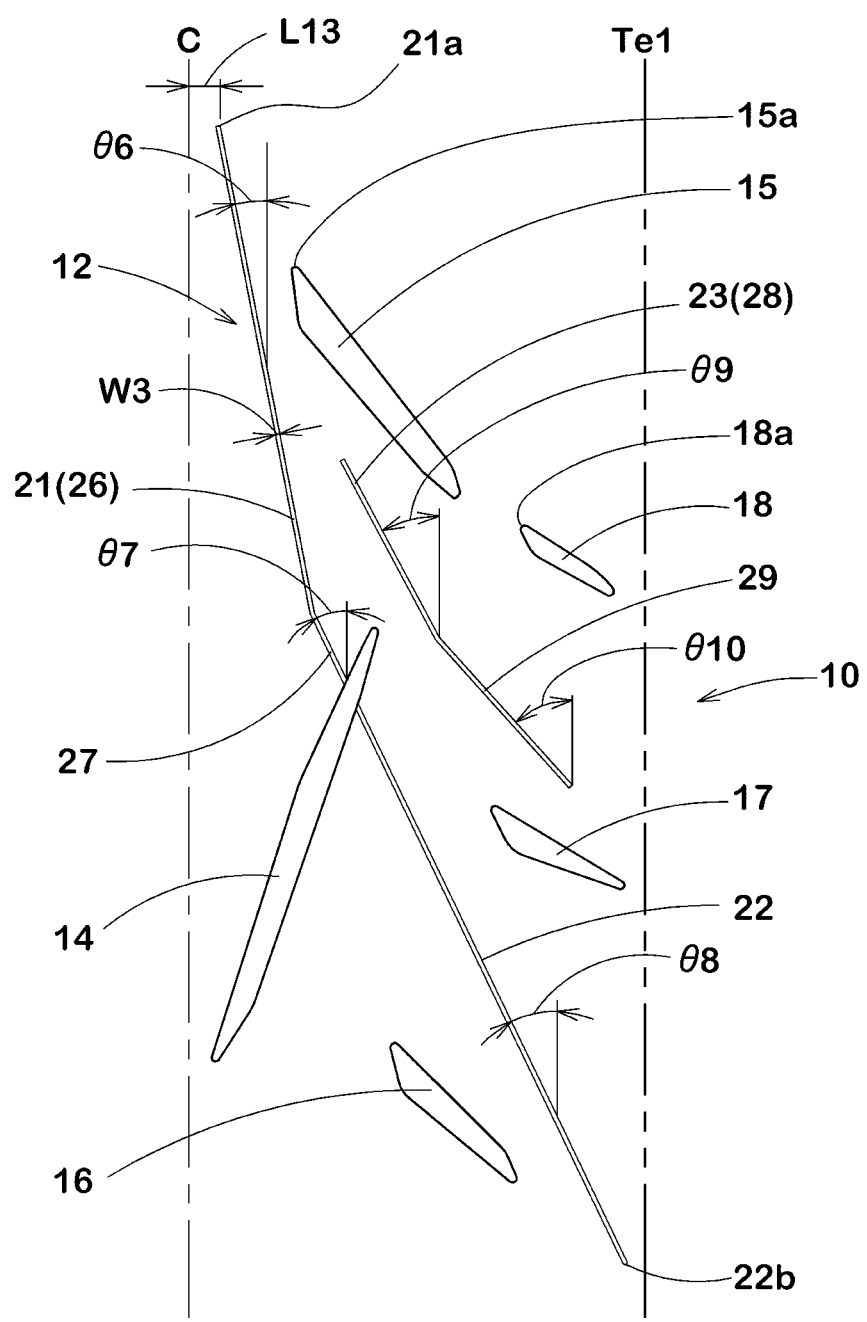
FIG. 4 is an enlarged view of sub-grooves of FIG. 2.

FIG. 4 illustrates an enlarged view of the sub-grooves 12 included in one first groove group 10. Note that in FIG. 4, some of the inclined main grooves 11 are not illustrated. As illustrated in FIG. 4, the first sub-groove 21, for example, includes a first portion 26 extending from a first end 21a located on the tire equator C side, and a second portion 27 connected to the first portion 26 and inclined at an angle θ7 greater than the angle θ6 of the first portion 26 with respect to the tire circumferential direction. The first portion 26 and the second portion 27 can maintain sufficient circumferential rigidity of a portion around the tire equator C, delivering better traction performance while maintaining the above effect.

Preferably, the angle θ6 of the first portion 26, for example, is in a range of from 5 to 15 degrees with respect to the tire circumferential direction. Preferably, the angle θ7 of the second portion 27, for example, is in a range of from 20 to 35 degrees with respect to the tire circumferential direction.

Preferably, an axial distance L13 from the first end 21a of the first sub-groove 21 to the tire equator C, for example, is in a range of from 0.03 to 0.10 times the tread development half width TWh. In this embodiment, the first end 21a of the first sub-grooves 21 is located forward in the rotation direction R with respect to the first end 15a of the outer main groove 15 to further improve wet performance.

Preferably, the first sub-groove 21, for example, is in communication with the inner main groove 14 at a location which is on the first tread edge Te1 side with respect to the center location in the tire axial direction of the inner main groove 14. The first sub-groove 21 as such, upon driving on wet road conditions, may suppress water in the inner main groove 41 to be sent toward the tire equator C, improving wet performance.

Preferably, the first sub-groove 21, for example, has a groove width W3 of from 0.3 to 1.5 mm. Preferably, the first sub-groove 21, for example, has a groove depth of from 0.2 to 1.5 mm. Note that the second sub-groove 22 and the third sub-groove 23 which are described later also have the same groove width and depth as the first sub-groove 21.

The second sub-groove 22, for example, extend from the inner main grooves 14 to the first tread edge Te1 side with the same inclination direction as the first sub-grooves 21.

The second sub-groove 22, for example, is in communication with the inner main groove 14 as a location which is on the first tread edge Te1 side with respect to the center location in the tire axial direction of the inner main grooves 14. In this embodiment, the second sub-groove 22 is arranged so as to be continuous smoothly to the first sub-groove 21 through the inner main groove 14. As used herein, the above "be continuous smoothly" shall mean that when one of the sub-grooves is expanded in its longitudinal direction, the extended region is in communication with the end of the other one of the sub-grooves.

Preferably, an angle θ8 of the second sub-groove 22, for example, is in a range of from 20 to 35 degrees with respect to the tire circumferential direction. Preferably, the angle θ8 of the second sub-groove 22 is greater than the angle θ6 of the first portion 26 of the first sub-groove 21. That is, the first sub-groove 21 may include a portion having an angle with respect to the tire circumferential direction which is smaller than that of the second sub-groove 22. In some preferred embodiments, the second sub-groove 22 is inclined at the same angle with respect to the tire circumferential direction as the second portion 27 of the first sub-groove 21.

The second sub-groove 22, for example, extends between the first short main groove 16 and the second short main groove 17 which are adjacent each other, and terminates without reaching the first tread edge Te1. In some preferred embodiments, a second end 22b of the second sub-groove 22 on the first tread edge Te1 side, for example, is located on the first tread edge Te1 side with respect to the first end 18a of the third short main groove 18.

In order to further improve roll property and wet performance in a well-balanced manner, in a pair of first and second sub-grooves 21 and 22 which are communicated with a same inner main groove 14, a circumferential distance L14 (shown in FIG. 2) from the first end 21a of the first sub-groove 21 to the second end 22b of the second sub-groove 22 is longer than the circumferential length of the inner main groove L5. Preferably, the distance L14 is in a range of from 2.0 to 3.0 times the length L5 of the inner main groove 14.

The third sub-groove 23, for example, is arranged on the first tread edge Te1 side with respect to the first sub-groove 21 and the second sub-groove 22. The third sub-groove 23, for example, is inclined in the same direction as the first sub-groove 21. The third sub-groove 23 has both ends which terminate within the tread land portion to improve roll property and wet performance in a well-balanced manner upon turning with large camber angles.

The third sub-groove 23, for example, includes a portion extending in the same inclination direction as the first sub-groove 21 between the inner main groove 14 and the outer main groove 15. The third sub-groove 23 according to the embodiment, for example, includes an inner portion 28 on the tire equator C side, and an outer portion 29 on the first tread edge Te1 side. The inner portion 28, for example, extends between the inner main groove 14 and the outer main groove 15 and has an angle θ9 which is greater than the angle θ6 of the first portion 26 of the first sub-groove 21 with respect to the tire circumferential direction. Preferably, the angle θ9 of the inner portion 28, for example, is of from 25 to 35 degrees.

The outer portion 29, for example, extends between the third short main groove 18 and the second short main groove 17 that is included in another first groove group 10 adjacent rearwardly in the rotation direction R, and is inclined with respect to the tire circumferential direction at an angle θ10 greater than the angle θ9 of the inner portion 28. The angle θ10 of the outer portion 29, for example, is greater than the angle θ8 of the second sub-groove 22. Specifically, the angle θ10 of the outer portion 29, for example, is of from 35 to 50 degrees.

In order to improve roll property further, the third sub-groove 23 preferably has a length which is longer than that of the outer main groove 15 but shorter than that of the inner main groove 14.

While the particularly preferable embodiments in accordance with the present disclosure have been described in detail, the present disclosure is not limited to the illustrated embodiments but can be modified and carried out in various aspects.

Example

Motorcycle tires for rear wheels with a basic tread pattern as shown in FIG. 1 and FIG. 2 were manufactured by way of trial based on the specification in Table 1. As for a comparative example (Ref.), a motorcycle tire which is not provided with any sub-grooves was also manufactured. The tread portion of the comparative example was a substantially same as the example tires as shown in FIG. 2 except for the above difference. Then, roll property and wet performance of each tire was evaluated. The common specification and the testing method for the test tires are as follows:
Test vehicle: motorcycle with a 1000 cc displacement
Tire size: 180/55ZR17
Rim size: MT5.50×17
Tire inner pressure: 290 kPa
Roll Property Test:
A rider drove the motorcycle having each test tire for the rear wheel on a racing circuit with a dry road condition to evaluate initial roll property as well as middle and final roll property by the rider's sense. The initial roll property is roll property for camber angles in a range of from 0 to the angle of 30% of the maximum camber angle. The middle and final roll property is roll property for camber angles over 30% of the maximum camber angle. The test results are shown in Table 1 using a score system, wherein the score of comparative example (Ref.) is set to 100. The larger the value, the better the property is.
Wet Performance Test:
A rider drove the motorcycle having each test tire for the rear wheel on a racing circuit with a wet road condition to evaluate wet performance by the rider's sense. The test results are shown in Table 1 using a score system, wherein the score of comparative example (Ref.) is set to 100. The larger the value, the better the wet performance is.

Table 1 shows the test results.

TABLE 1

|  | Ref. | Ex. 1 | Ex. 2 | Ex. 3 | Ex. 4 | Ex. 5 | Ex. 6 | Ex. 7 | Ex. 8 |
|---|---|---|---|---|---|---|---|---|---|
| First sub-grooves | none | presence | presence | presence | presence | presence | presence | presence | presence |
| Second sub-grooves | none | presence | none | presence | none | presence | presence | presence | presence |
| Third sub-groove | none | presence | none | none | presence | presence | presence | presence | presence |
| First sub-groove widths (mm) | — | 0.90 | 0.90 | 0.90 | 0.90 | 0.30 | 0.60 | 1.2 | 1.5 |

TABLE 1-continued

|  | Ref. | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| First sub-groove depths (mm) | — | 0.85 | 0.85 | 0.85 | 0.85 | 0.2 | 0.5 | 1.1 | 1.5 |
| Initial roll property (score) | 100 | 107 | 107 | 107 | 106 | 107 | 107 | 106 | 105 |
| Middle/final roll property (score) | 100 | 104 | 103 | 101 | 101 | 104 | 104 | 104 | 103 |
| Wet performance (score) | 100 | 110 | 106 | 108 | 108 | 105 | 108 | 110 | 111 |

From the test results, it is confirmed that the example motorcycle tires improve wet performance while maintaining better roll property.

What is claimed is:

1. A motorcycle tire comprising:
a tread portion comprising a ground contact surface curved in an arc shape manner to protrude radially outwardly, a first tread edge and a tire equator, the tread portion provided with inclined main grooves arranged between the tire equator and the first tread edge and sub-grooves smaller than the inclined main grooves in groove width;
the inclined main grooves comprising inner main grooves each extending from a first end located on the tire equator side to a second end located on the first tread edge side with an inclination with respect to a tire circumferential direction, wherein no other grooves are provided between the first end of each inner main groove and the tire equator; and
the sub-grooves comprising first sub-grooves extending from the inner main grooves toward the tire equator with an opposite inclination direction to the inner main grooves with respect to the tire circumferential direction and terminating on the tire equator side without being communicated with any other grooves, wherein
a circumferential length of the first sub-grooves is longer than a circumferential length of the inner main grooves.

2. The motorcycle tire according to claim 1, wherein the tread portion has a designated rotation direction, and the inner main grooves each extend from the first end forwardly in the rotation direction toward the first tread edge.

3. The motorcycle tire according to claim 1, wherein the sub-grooves comprise second sub-grooves extending from the inner main grooves toward the first tread edge with a same inclination direction as the first sub-grooves with respect to the tire circumferential direction.

4. The motorcycle tire according to claim 3, wherein the first sub-grooves each comprise a portion having an angle with respect to the tire circumferential direction smaller than that of each of the second sub-grooves.

5. The motorcycle tire according to claim 3, wherein the respective second sub-grooves are smoothly continuous to the respective first sub-grooves through the inner main grooves such that an extended region of each of the respective second sub-grooves, formed by expanding each of the respective second sub-grooves in its longitudinal direction, is in communication with an end of one of the respective first sub-grooves.

6. The motorcycle tire according to claim 3, wherein in a pair of the first and second sub-grooves which are communicated with a same one of the inner main grooves, a circumferential distance from a first end of the first sub-groove of the pair located on the tire equator side to a second end of the second sub-groove of the pair located on the first tread edge side is longer than a circumferential length of the same one of the inner main grooves.

7. The motorcycle tire according to claim 1, wherein groove widths of the first sub-grooves are in a range of from 0.3 to 1.5 mm.

8. The motorcycle tire according to claim 1, wherein groove depths of the first sub-grooves are in a range of from 0.2 to 1.5 mm.

9. The motorcycle tire according to claim 1, wherein the inclined main grooves comprise outer main grooves arranged on the first tread edge side of the first sub-grooves and inclined in an opposite direction to the inner main grooves.

10. The motorcycle tire according to claim 9, wherein the respective outer main grooves overlap regions where the respective inner main grooves are expanded in a longitudinal direction thereof.

11. The motorcycle tire according to claim 9, wherein the sub-grooves comprise third sub-grooves each having a portion that is inclined in a same direction as the first sub-grooves in a region between one inner main groove and one adjacent outer main groove.

12. The motorcycle tire according to claim 4, wherein the respective second sub-grooves are smoothly continuous to the respective first sub-grooves through the inner main grooves such that an extended region of each of the respective second sub-grooves, formed by expanding each of the respective second sub-grooves in its longitudinal direction, is in communication with an end of one of the respective first sub-grooves.

13. The motorcycle tire according to claim 4, wherein in a pair of first and second sub-grooves which are communicated with a same inner main groove, a circumferential distance from a first end of the first sub-groove located on the tire equator side to a second end of the second sub-groove located on the first tread edge side is longer than a circumferential length of the inner main groove.

14. The motorcycle tire according to claim 5, wherein in a pair of first and second sub-grooves which are communicated with a same inner main groove, a circumferential distance from a first end of the first sub-groove located on the tire equator side to a second end of the second sub-groove located on the first tread edge side is longer than a circumferential length of the inner main groove.

15. The motorcycle tire according to claim 2, wherein the inclined main grooves comprise outer main grooves arranged on the first tread edge side of the first sub-grooves and inclined in an opposite direction to the inner main grooves.

16. The motorcycle tire according to claim 3, wherein a circumferential length of the second sub-grooves is longer than the circumferential length of the inner main grooves.

17. The motorcycle tire according to claim 1, wherein
the first sub-grooves extend from a portion of the inner main grooves closer to the second end of the inner main grooves than to the first end of the inner main grooves toward the tire equator, and
the second end of each of the inner main grooves is a terminating end of each of the inner main grooves.

18. The motorcycle tire according to claim 1, wherein
each first sub-groove comprises a first portion extending from a first end located on the tire equator side, and a second portion connected to the first portion and inclined at an angle greater than an angle of the first portion with respect to the tire circumferential direction.

19. The motorcycle tire according to claim 1, wherein
the sub-grooves comprise third sub-grooves, and
a first end and a second end of each of the third sub-grooves terminate within the tread land portion.

20. The motorcycle tire according to claim 1, wherein
the inclined main grooves further comprise outer main grooves, each of the outer main grooves having a groove width which varies in the longitudinal direction such that a maximum groove width portion is positioned on the tire equator side with respect to a center location in the tire axial direction of the outer main groove, and
the groove width of each of the outer main grooves monotonically decreases from the maximum width portion to an end of the outer main groove closest to one of the inner main grooves closest to the outer main groove.

\* \* \* \* \*